(12) United States Patent
Vaisler et al.

(10) Patent No.: US 12,328,482 B2
(45) Date of Patent: Jun. 10, 2025

(54) METHODS AND SYSTEMS FOR FILTERING MEDIA CONTENT

(71) Applicant: Adeia Guides Inc., San Jose, CA (US)

(72) Inventors: Ofer Vaisler, Sunnyvale, CA (US); Olivier Chalouhi, Mountain View, CA (US); Rob Marquardt, Pacifica, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/385,745

(22) Filed: Oct. 31, 2023

(65) Prior Publication Data

US 2024/0064382 A1 Feb. 22, 2024

Related U.S. Application Data

(63) Continuation of application No. 17/539,694, filed on Dec. 1, 2021, now Pat. No. 11,849,191, which is a continuation of application No. 16/451,276, filed on Jun. 25, 2019, now Pat. No. 11,212,589, which is a continuation of application No. 15/434,890, filed on Feb. 16, 2017, now Pat. No. 10,382,825.

(60) Provisional application No. 62/384,634, filed on Sep. 7, 2016.

(51) Int. Cl.
 *G06F 16/48* (2019.01)
 *H04N 21/482* (2011.01)

(52) U.S. Cl.
 CPC ......... *H04N 21/4828* (2013.01); *G06F 16/48* (2019.01)

(58) Field of Classification Search
 CPC ..................... G06F 16/48; H04N 21/4828

USPC .......................................................... 707/722
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 9,063,984 B1 * | 6/2015 | Sandland | G06F 16/955 |
| 2002/0174430 A1 | 11/2002 | Ellis et al. | |
| 2004/0003403 A1 | 1/2004 | Marsh | |
| 2005/0251827 A1 | 11/2005 | Ellis et al. | |

(Continued)

*Primary Examiner* — Joshua Bullock
(74) *Attorney, Agent, or Firm* — HALEY GUILIANO LLP

(57) ABSTRACT

Method and systems are disclosed for presenting media asset identifiers retrieved based on a user search criteria. User's input of a first information, a second information, and a third information is received. The system identifies an information type associated with each received information. If the first information and the third information are associated with the same information type, a first query is created that combines the first information and the third information to retrieve media asset identifiers according to information type instructions associated with the first information type. The second information is integrated into the first query. If the second information and the third information are associated with the same information type, a second query is created that combines that second information and the third information to retrieve media asset identifiers according to instructions associated with the second information type. The first information is integrated into the second query.

20 Claims, 10 Drawing Sheets

(56) References Cited

U.S. PATENT DOCUMENTS

| | | | |
|---|---|---|---|
| 2008/0086456 A1* | 4/2008 | Rasanen | H04N 21/4622 348/E7.071 |
| 2010/0153885 A1* | 6/2010 | Yates | G06F 16/7867 707/723 |
| 2015/0379132 A1* | 12/2015 | Cho | G06F 16/9535 707/722 |
| 2016/0142783 A1* | 5/2016 | Bagga | H04N 21/47214 725/47 |
| 2022/0201365 A1 | 6/2022 | Vaisler et al. | |

* cited by examiner

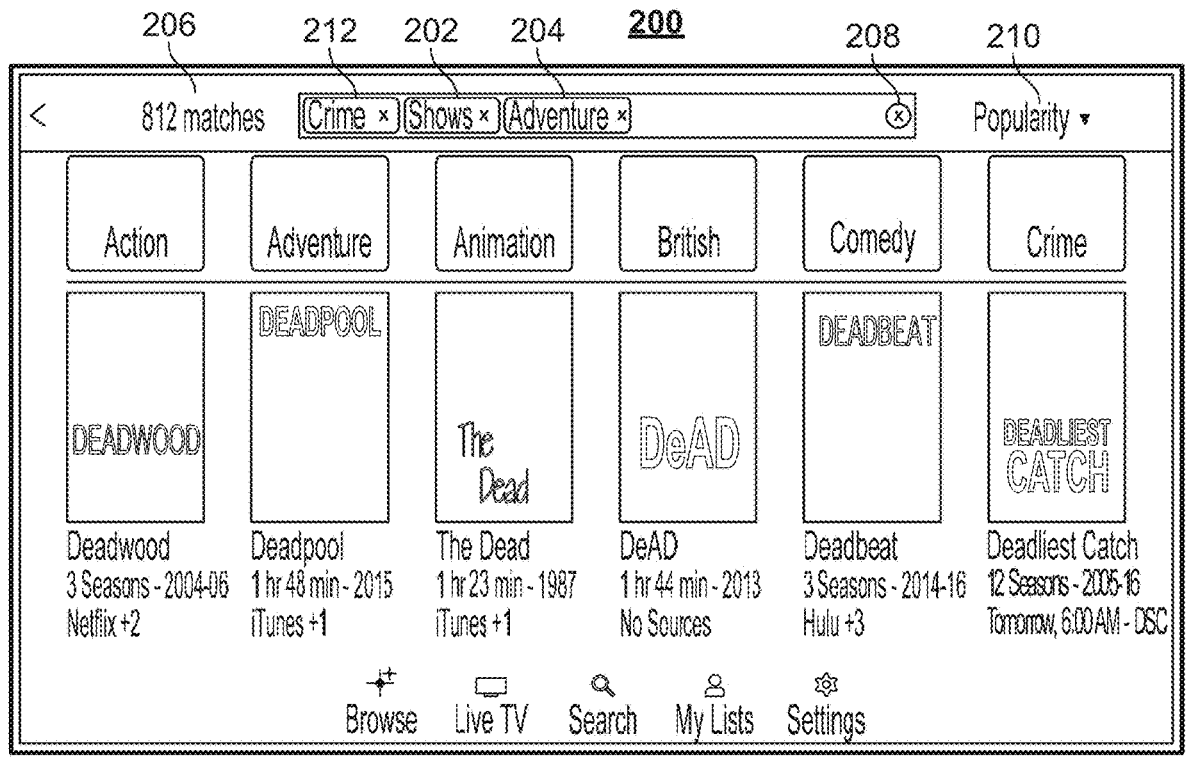
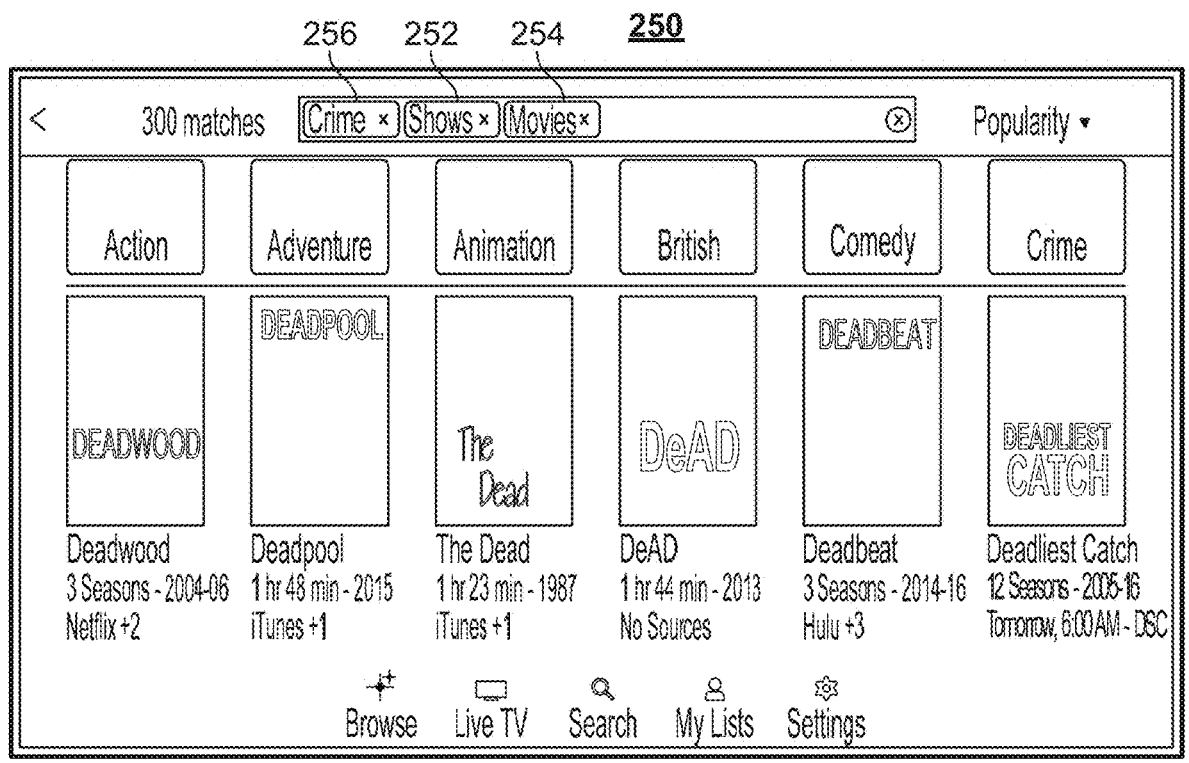
FIG. 2

800

802 — Receive a First User Selection of a First Filter Option Associated with a First Filter that is Configured as a Division Filter, Wherein the Division Filter is a Filter Configured for Selecting those Media Assets that Match All Filter Options Associated with the Division Filter 804 — Receive a Second User Selection of a Second Filter Option Associated with a Second Filter that is Configured as a Combination Filter, Wherein the Combination Filter is a Filter Configured for Selecting those Media Assets that Match At Least One Filter Option Associated with the Combination Filter 806 — Receive a Third User Selection of a Third Filter Option 808 — Based on the Third Filter Option Being Associated with the First Filter, Generate for Display Media Asset Identifiers Corresponding to those Media Assets that Match All of the First Filter Option, the Second Filter Option, and the Third Filter Option 810 — Based on the Third Filter Option Being Associated with the Second Filter, Generate for Display those Media Asset Identifiers that Correspond to Media Assets that Match At Least One of the First Filter Option and the Second Filter Option, and the First Filter Option and the Third Filter Option

FIG. 8

METHODS AND SYSTEMS FOR FILTERING MEDIA CONTENT

CROSS-REFERENCE TO RELATED APPLICATIONS

This application is a continuation of U.S. patent application Ser. No. 17/539,694, filed Dec. 1, 2021, which is a continuation of U.S. patent application Ser. No. 16/451,276, filed Jun. 25, 2019, now U.S. Pat. No. 11,212,589, which is a continuation of U.S. patent application Ser. No. 15/434,890, filed Feb. 16, 2017, now U.S. Pat. No. 10,382,825, which claims the benefit of U.S. provisional application No. 62/384,634, filed Sep. 7, 2016, which are hereby incorporated by reference herein in their entireties.

BACKGROUND

The amount of media available to users has grown tremendously in the last few years. Users need an efficient and flexible system to find desired media. Specifically, users not only need a way to search for media assets that they desire to consume, but also a way of automatically differentiating media that is of interest to a user from media that is not of interest to the user. Current media guidance systems provide users with different search options so that users are able to find media assets based on user input. However, current systems are not flexible enough to be able to process information input by the user in different ways depending on information types with which the user's inputs are associated. Furthermore, current systems are unable to override how the information is processed according to those information types under specific conditions.

SUMMARY

Methods and systems are disclosed herein for a media guidance application that enables a user to efficiently and flexibly find desired media. The media guidance application may receive search criteria via user input and determine for each input criterion a type of the criterion (e.g., genre, network, provider, release date, age, or another suitable type). If at least three criterions are input, and two of the three are of the same type, the media guidance application may determine if the type (e.g., genre or release date) of the criterions is one that lends itself to finding media assets that match both criterions or finding media assets that match at least one criterion. For example, two input criterions may be comedy and romance (i.e., both of a type genre), the media guidance application may determine that media assets are desired that match both criterions (e.g., media assets that are romantic comedies). However, if two input criterions are 2010 and 2012 (i.e., both of a type release date), the media guidance application may determine that media assets are desired that match either the 2010 release year or the 2012 release year. When the determination of a type is made, the media guidance application may combine the two inputs with the third input and create a query for media assets that match the criteria.

In some aspects, the media guidance application may generate for display to a user one or more display screens that enable the user to filter media content. One of the display screens may include a plurality of filters enabling the user to select each of those filters to be presented with a plurality of filter options for each filter. For example, the media guidance application may generate for display filters such as type, genres, services, network, release date, ages, and other suitable filters. When the media guidance application receives a selection of one of the filters, the media guidance application may generate for display an area on the display screen displaying filter options associated with each filter. In some embodiments, the media guidance application may generate a new display screen displaying the filter options for the filter.

For example, if the media guidance application receives a user selection of the "types" filter, the media guidance application may in response generate for display available filter options for "types" (e.g., shows and movies). The media guidance application may generate for display the different filter options in an area of the original display screen or generate for display a new display screen. If the media guidance application receives a user selection of a filter option (e.g., movies), the media guidance application may store the selection and update the display screen to remove the filter options from the display screen.

The media guidance application may generate for display for each filter option the name of the filter option and also an image associated with the filter option. For example, for the "type" filter, the media guidance application may generate for display two filter options that include text for each option (e.g., movies and shows) and a background image for each option (e.g., a movie reel icon for movies and a television set icon for shows).

In some embodiments, the display screen may include a plurality of indications each corresponding to a media asset. For example, the display screen may include a plurality of images (e.g., box art) each representing a media asset. In some embodiments, the media guidance application may generate for display metadata associated with each media asset and present the user with information about the media asset. For example, the media guidance application may generate for display a title associated with each media asset on the display screen, a play time associated with each media asset, a release date, and other suitable information.

In some embodiments, the media guidance application may generate for display an indication of a source from which the media asset is available. For example, a media asset may be available from one or more sources (e.g., Hulu®, Netflix®, iTunes®, broadcast TV, or another suitable source). It should be noted that the sources may be classified as on-demand sources and broadcast sources. The media guidance application may generate for display different types of indicators for different sources. For example, for an on-demand source like iTunes®, the media guidance application may generate for display the name of the source and for a broadcast source the media guidance application may generate for display the date and time associated with the broadcast of the media asset (e.g., at what time the media asset will be broadcast) and a channel associated with the broadcast.

In some embodiments, the media guidance application may be configured to determine that a media asset is available from multiple sources (e.g., by transmitting a query to a database that stores information on media assets). Based on the determination, the media guidance application may generate for display an indicator indicating other available sources. For example, the media guidance application may generate for display a name of one of the sources from which the media asset is available and also a number indicating a number of other available sources from which the media asset is available. If the media guidance application determines that a media asset is available from Hulu®, Netflix®, and iTunes®, the media guidance application may generate for display "iTunes+2" to indicate two other sources from which the media asset is available. In some embodiments, the indication may be selectable and in response to the selection of the indication, the media guidance application may generate for display information for other sources from which the media asset available.

In some embodiments, the media guidance application may determine that the media asset is not available from any source (e.g., by transmitting a query to a database that stores information on media assets). In those instances, the media guidance application may generate an indication (e.g., "No Sources") to indicate to the user that the media asset is not available from any source.

In some embodiments, the media guidance application may include metadata (e.g., stored in the database) for media assets regardless of whether those media assets are available from specific sources. For example, a specific media asset may not be available from a set of sources that the media guidance application is able to access, but the media guidance application may still generate for display an indication of the media asset. If the media guidance application gains access to a new source (e.g., Amazon Prime®) and the media asset is available from that new source, the media guidance application may update the database to indicate this new availability.

In some embodiments, as the media guidance application receives user selections of different filter options, the media guidance application may update the display screen to take into account those selections and may generate for display indicators indicating which filter options have been chosen so far. For example, if the media guidance application receives a user selection of the "types" filter indicating a user selection of the "shows" filter option, the media guidance application may generate for display an indication indicating that the "shows" filter option user selection has been received. If the media guidance application receives another user selection (e.g., of a "genre" filter and an "adventure" filter option), the media guidance application may generate for display a second indicator indicating the second user selection.

In some embodiments, the media guidance application may generate for display an option for the user to "deselect" one or more of the previously selected filter options. When the media guidance application receives a user selection of the option, the media guidance application may remove that filter option from the selection. In some embodiments, the media guidance application may generate for display an option that enables a user to "deselect" all the selected filter options. If the media guidance application receives a user selection of that option, the media guidance application may generate for display indications of all media assets that the media guidance application is able to obtain metadata for (e.g. retrieve from a database).

In some embodiments, the media guidance application may include an indicator indicating a number of media assets that have been matched. The media guidance application may update that indicator as the user selects or deselects filter options. Additionally or alternatively, the media guidance application may generate for display a search box, enabling a user to search within the media assets matched by the selected filter options. In some embodiments, the media guidance application may generate for display an option for the user to sort the media assets. For example, if the media guidance application receives a user selection to sort the media assets by popularity, the media guidance application may access popularity scores for each media asset to perform the sorting.

In some embodiments, the media guidance application may, in response to receiving a user selection of the "Ages" filter, generate for display a plurality of filter options enabling a user to select age criteria for filtering. For example, if the media guidance application receives a user selection of the "children" filter option, the media guidance application may filter out any media assets that are not appropriate for children.

In some embodiments, the media guidance application may receive multiple selections of filter options from the user (e.g., "Action" filter option for "Genre" filter, "Netflix®" and "Amazon Prime®" filter options for "Services" filter, HBO® filter option for "Network" filter, and "Children" filter option for "Age" filter). When the media guidance application processes all the received filter options, the media guidance application may determine that no media assets match all the received filter options. In response, the media guidance application may generate for display indications of media assets where the media assets do not match all the filters, but only some of the filter options (i.e., change the "AND" operation to an "OR" operation for some filter options).

For example, if both Netflix® and Amazon Prime® services are selected, the media guidance application may generate for display media assets that are available from either Amazon Prime® or Netflix® instead of from both of those services. In another example, if the media guidance application receives a selection of both comedy genre and action genre, the media guidance application may generate for display media assets that match either the comedy genre or the action genre instead of matching both the comedy genre and the action genre.

In some embodiments, the media guidance application may be configured to update the manner in which filter options are applied, as the media guidance application receives user selections of filter options. For example, if the media guidance application receives a filter option of "Movies," and then another filter option for "Action," the media guidance application may generate for display indications of media assets that match both the "Movies" filter option and the "Action" filter option. However, if the media guidance application subsequently receives a user selection of a "Comedy" genre, the media guidance application may generate for display indications of movies that are comedies and movies that are action (i.e., modifying the application of filter options from matching all filter options to matching some of them).

In some embodiments, the media guidance application may automatically select one or more filter options based on the ages of user or users who are consuming the media assets. For example, if the media guidance application detects that children are present in the room where media content is being consumed, the media guidance application may determine the ages of the children and add to the filter the appropriate "Age" filter option (e.g., "Children"). In some embodiments, the media guidance application may determine that the user has one or more children and retrieve the ages of those children. The media guidance application may automatically select an "Age" filter option based on the age(s) of the children.

In some embodiments, the media guidance application may automatically select default filter options based on a profile associated with the user that is consuming the media content. For example, if the user is known to prefer action movies, the media guidance application may add the "Movies" filter option for the "Type" filter and the "Action" filter option for the "Genre" filter.

In some aspects, a media guidance application may be configured to process different types of filters and filter media assets differently based on the different types. The media guidance application may receive a user selection of a filter option from two different types of filters, respectively. The first filter may be a division filter, where the division filter is a filter configured for selecting those media assets that match each selected filter option associated with the division filter. The second filter may be a combination filter, where the combination filter is a filter configured for selecting those media assets that match at least one selected filter option associated with the combination filter.

The media guidance application receives a third user selection of a third filter option. If the third filter option is an option associated with the first filter (e.g., a filter option from a plurality of filter options for the first filter), the media guidance application may generate for display media asset identifiers corresponding to those media assets that match all filter options (first filter option, second filter option, and third filter option) received from the user. If, however, the third filter option is an option associated with the second filter, the media guidance application may generate for display those media asset identifiers that correspond to media assets that match at least one of the combination of (1) the first filter option and the second filter option, and (2) the first filter option and the third filter option.

The media guidance application may receive and process a filter option for a division filter. Specifically, the media guidance application may receive a first user selection of a first filter option associated with a first filter that is configured as a division filter, where the division filter is a filter configured for selecting those media assets that match each selected filter options associated with the division filter. For example, a "Genre" filter may include filter options for "Comedy," "Romance," "Action," "Adventure," and other suitable filter options. By default, the "Genre" filter may be configured as a division filter where if the media guidance application receives user selections of a "Comedy" filter option and a "Romance" filter option, the media guidance application may process these filter options to select media assets that match both the "Comedy" genre and the "Romance" genre (e.g., filter for Romantic Comedies).

The media guidance application may receive and process a filter option for a combination filter. Specifically, the media guidance application may receive a second user selection of a second filter option associated with a second filter that is configured as a combination filter, where the combination filter is a filter configured for selecting those media assets that match at least one selected filter option associated with the combination filter. For example, a "Services" filter may include filter options for Hulu®, Netflix®, iTunes®, Amazon Prime®, and other suitable filter options. By default, the "Services" filter may be configured as a combination filter where if the media guidance application receives user selections of a Hulu® filter option and a Netflix® filter option, the media guidance application may process these filter options to select media assets that match either the Hulu® service provider or the Netflix® service provider.

The media guidance application may receive a third user selection of a third filter option and perform actions based on which filter the third filter option is associated with.

Based on the third filter option being associated with the first filter, the media guidance application may generate for display media asset identifiers corresponding to those media assets that match all of the first filter option, the second filter option, and the third filter option. For example, if the media guidance application receives "Comedy" as the first filter option, "Netflix®" as the second filter option and "Romance" as the third filter option, the media guidance application may match media assets that are available from Netflix® that match the "Comedy" genre and the "Romance" genre (i.e., romantic comedies available on Netflix®).

Based on the third filter option being associated with the second filter, generating for display those media asset identifiers that correspond to media assets that match at least one of the first filter option and the second filter option, and the first filter option and the third filter option. For example, if the media guidance application receives "Comedy" as the first filter option, "Netflix®" as the second filter option and "Amazon Prime®" as the third filter option, the media guidance application may match media assets that are available from Netflix® that match the "Comedy" genre media assets media assets available from Amazon Prime® that match the "Comedy" genre (i.e. comedies available on Netflix® and also comedies available from Amazon Prime®).

In some embodiments, the media guidance application may reconfigure a division filter as a combination filter. Specifically, the media guidance application may reconfigure the first filter as a combination filter, and generate for display those media asset identifiers corresponding to media assets that match at least one of the first filter option and the third filter option, and the first filter option and the third filter option according to the reconfigured first filter. For example, as described above, a "Genre" filter may include filter options for "Comedy," "Romance," "Action," "Adventure," and other suitable filter options. By default, the "Genre" filter may be configured as a division filter. However, the media guidance application may reconfigure this filter as a combination filter. In this instance, the media guidance application may receive user selections of a "Comedy" filter option and a "Romance" filter option and may process these filter options to select media assets that match at least one of the "Comedy" genre and the "Romance" genre (e.g., filter for Romance movies and also Comedy movies).

In some embodiments, the media guidance application may reconfigure the first filter in response to determining that no media assets match both the first filter option and the third filter option. For example, if there are no romantic comedies available, the media guidance application may process the filter options to match romance movies and separately comedies.

In some embodiments, the third filter option may be associated with a completely different filter. The media guidance application may in response to determining that the third filter option is associated with a third filter that is different from the first filter and the second filter, generate for display those media asset identifiers that correspond to media assets that match both the first filter option and the third filter option, and those media asset identifiers that match both the second filter option and the third filter option according to the first filter, the second filter, and the third filter. For example, the media guidance application may receive a user selection of a first filter option of "Comedy," a second filter option of "Netflix®," and a third filter option of "Children," the media guidance application may match comedies for children and separately match comedies available from Netflix®.

In some embodiments, the media guidance application may reconfigure a combination filter into a division filter. Specifically, the media guidance application may reconfigure the second filter into a division filter, and generate for display those media asset identifiers corresponding to media assets that match all of the first filter option, the second filter option, and the third filter option according to the reconfigured second filter. For example, a "Genre" filter may include filter options for "Comedy," "Romance," "Action," "Adventure," and other suitable filter options. By default, the "Genre" filter may be configured as a combination filter where if the media guidance application receives user selections of a "Comedy" filter option and a "Romance" filter option, the media guidance application may process these filter options to select media assets that match either the "Comedy" genre or the "Romance" genre (e.g., filter for Romance movies and separately for Comedy movies). When the filter is reconfigured into a division filter, the media guidance application may select media assets that match both the "Comedy" genre and the "Romance" genre (e.g., filter for romantic comedies).

In some embodiments, the media guidance application may reconfigure the second filter in response to determining that a number of media assets match both the first filter option and the third filter option exceeds a predefined threshold. For example, if too many results are returned (e.g., more than one hundred), the media guidance application may reconfigure the filter to present fewer results.

Alternatively or additionally, the media guidance application may implement the above-described methods and systems by taking the following actions. The media guidance application may receive user input of the first information, the second information and the third information. For example, the media guidance application may receive a user input of three different criterions. Those may include comedy, Netflix®, and romance. Alternatively, the three criterions may include comedy, Netflix®, and Amazon Prime®.

The media guidance application may determine a respective information type corresponding to the different information received via user input. Specifically, the media guidance application may determine that the first information is associated with a first information type and that the second information is associated with a second information type. The media guidance application may determine whether the third information is associated with the first information type or the second information type. For example, if the first, second and third information are, respectively, comedy, Netflix®, and romance, the media guidance application may determine that comedy is of a "genre" information type, Netflix® is of a "service" information type, and romance is of a "genre" information type. Alternatively, if first, second and third information are, respectively, comedy, Netflix®, and Amazon Prime®, the media guidance application may determine that comedy is of a "genre" information type, Netflix® is of a "service" information type, and Amazon Prime® is of a "service" information type.

In response to determining that the third information is associated with the first information type, the media guidance application may take the following actions. For example, as described above, if the first, second and third information are, respectively, comedy, Netflix®, and romance, the media guidance application may process the first, second, and third information as follows.

The media guidance application may obtain instructions associated with the first information type that instruct the media guidance application to search for media assets that match each different information that was received via user input. Specifically, the media guidance application may receive instructions associated with the first information type to generate a query for retrieving media asset identifiers corresponding to media assets that match each information that (1) was input by the user and (2) is associated with the first information type.

For example, each information type may have an associated data structure that stores metadata associated with the information type. The metadata may include instructions for combining different information of the information type. For example, a "genre" information type may include instructions to generate a query for media asset identifiers corresponding to media assets that match each of the information associated with the first information type received via user input (e.g., a query for media assets that are romantic comedies).

The media guidance application may, based on the instructions, generate a query that combines the received different information of the first information type. The query may search for media assets that match each information of the first information type. Specifically, the media guidance application may generate, based on the instructions associated with the first information type, a first query for a first set of media assets identifiers corresponding to media assets that match each of the first information and the third information. For example, if the first, second and third information are, respectively, comedy, Netflix®, and romance, the media guidance application may generate a query that combines comedy (i.e., the first information) with romance (i.e., the third information) so that the resulting query searches for media assets that match both the romance genre and the comedy genre (i.e., romantic comedies).

The media guidance application may modify the generated first query in order to combine the information of the first information type with the second information received via user input. Specifically, the media guidance application may modify, based on the second information, the first query for retrieving a modified first set of media asset identifiers, each media asset identifier of the modified first set corresponding to a respective media asset that matches each of the second information, the first information, and the third information. For example, if the first, second and third information are, respectively, comedy, Netflix®, and romance, the media guidance application may modify the first query to search for romantic comedies that are available on Netflix®.

The media guidance application may use the first query to retrieve results for the user. Specifically, the media guidance application may retrieve, based on the first query, the modified first set of media asset identifiers. For example, the media guidance application may transmit the first query to a database and, receive from the database media asset identifiers corresponding to media assets that match the first query.

In response to determining that the third information is associated with the second information type, the media guidance application may take the following actions. For example, as described above if the first, second and third information are, respectively, comedy, Netflix®, and Amazon Prime®, the media guidance application may process the first, second, and third information as follows.

The media guidance application may obtain instructions associated with the second filter that instruct the media guidance application to search for media assets that match at least one different information that was received via user input. Specifically, the media guidance application may receive instructions associated with the second information type to generate a query for media asset identifiers corresponding to media assets that match at least one information that (1) was input by the user and (2) is associated with the second information type. For example, each information type may have an associated data structure that stores metadata associated with the information type. The metadata may include instructions on how to combine different information of the information type. For example, a "service" information type may include instructions to generate a query for media asset identifiers corresponding to media assets that match at least one of the information associated with the service information type received via user input (e.g., a query for media assets that are available on Netflix® and separately available on Amazon Prime®).

The media guidance application may generate a query based on the instructions for media asset identifiers corresponding to media assets that match at least one of the second information and the third information (e.g., media assets available on Netflix® or on Amazon Prime®). Specifically, the media guidance application may generate, based on the instructions associated with the second information type, a second query for a second set of media asset identifiers, each media asset identifier of the second set corresponding to a respective media asset that matches at least one of the second information and the third information. For example, the media guidance application may generate a query for two sets of media asset identifiers. A first set of media asset identifiers corresponding to media assets available from Netflix® and a second set of media asset identifiers corresponding to media assets available from Amazon Prime®.

The media guidance application may modify the second query to incorporate the first information into the query. Specifically, the media guidance application may modify, based on the first information, the second query for retrieving a modified second set of media asset identifiers, each media asset identifier of the modified second set corresponding to a respective media asset that matches the first information and at least one of the second information and the third information. In following the example above, if the first, second and third information are, respectively, comedy, Netflix®, and Amazon Prime®, the media guidance application may modify the second query to search for comedies available on Netflix® and separately for comedies available on Amazon Prime®.

The media guidance application may use the second query to retrieve results for the user. Specifically, the media guidance application may retrieve, based on the second query, the modified second set of media asset identifiers. For example, the media guidance application may transmit the second query to a database and, receive from the database media asset identifiers corresponding to media assets that match the second query.

In some embodiments, the media guidance application may, in response to determining that the third information is associated with the first information type, take the following actions. The media guidance application may determine whether a number of media asset identifiers in the modified first set of media asset identifiers exceeds a threshold. For example, the media guidance application may have retrieved too few (e.g., zero) media asset identifiers based on the first query. Thus, the user received no results for the search criteria. It should be noted that the threshold may be any suitable number of media asset identifiers. For example, the threshold may be ten or five media asset identifiers.

The media guidance application may in response to determining that the number of media asset identifiers in the modified first set doesn't exceed the threshold, modify the query to expand the number of search results. The media guidance application may modify the query by changing the query to search for media assets that match the second information and at least one of the first information and the third information. Specifically, the media guidance application may, in response to determining that the number of media asset identifiers in the modified first set of media asset identifiers does not exceed the threshold, modify the first query to retrieve a third set of media asset identifiers, each media asset identifier in the third set corresponding to a respective media assets that matches the second information and at least one of the first information and the third information. For example, if the first query is for searching for media assets that match each of romance, Netflix®, and comedy (i.e., romantic comedies available from Netflix®) and not enough search results are found, the media guidance application may modify the query to search for media assets that match romance and Netflix® (i.e., romance available on Netflix®) and separately for comedy and Netflix® (i.e., comedies available on Netflix®).

In some embodiments, the media guidance application may, in response to determining that the third information is associated with the second information type, perform the following actions. The media guidance application may determine whether a number of media asset identifiers in the modified second set of media asset identifiers exceeds a threshold. For example, the media guidance application may have retrieved too many (e.g., 8,000) media asset identifiers based on the second query. It should be noted that the threshold may be any suitable number of media asset identifiers. For example, the threshold may be five hundred media asset identifiers.

The media guidance application may in response to determining that the number of media asset identifiers in the modified second set exceeds the threshold, modify the query to narrow the number of search results. The media guidance application may modify the query by changing the query to search for media assets that match each of the second information, the first information, and the third information. For example, if the first query is for searching for media assets that match romance and at least one of Netflix®, and Amazon Prime® (i.e., romance available on Netflix® and separately comedies available one Amazon Prime®) and too many search results are found, the media guidance application may modify the query to search for media assets that match romance, Netflix®, and Amazon Prime® (i.e., romance available from Netflix® and also available from Amazon Prime®).

In some embodiments, the media guidance application may determine the threshold based on capabilities of a display. Specifically, the media guidance application may determine, based on capabilities of a display and a size associated with a respective indicator corresponding to each media asset identifier in the third set of media asset identifiers, a number of indicators of the media asset identifiers included in the modified second set of media asset identifiers that may be displayed simultaneously on the display. For example, it may be desirable to present to the user only one screen of available media assets so that the user is able to quickly choose a media asset to consume without having to scroll through different screens. The media guidance application may determine of how many indicators of media assets the display screen can fit. The media guidance application may set the number of indicators as the threshold.

In some embodiments, the instructions associated with an information type may include Boolean operator for combining the different information received via user input. Specifically, the media guidance application may, when receiving instructions associated with the second information type to generate a query for retrieving media asset identifiers corresponding to media assets that match each information that (1) was input by the user and (2) is associated with the second information type, retrieve from a data structure associated with the first information type a Boolean operator for generating the second query. For example, the second information type may include the Boolean operator "AND" as part of the instructions, indicating that any matching media assets must match each of the information received via user input.

In some embodiments, the Boolean operator may be one of AND, OR, Exclusive OR, AND NOT, and NOT. For example, each information type may be associated with one of these Boolean operators that instruct the media guidance application how information associated with each information type is to be combined.

In some embodiments, the media guidance application may add to the second query two criterion (e.g., the second information and the third information) connected with the Boolean operator corresponding to the information type. Specifically, the media guidance application may, when generating, based on the instructions associated with the second information type, the second query, add, to the second query, the second information, the Boolean operator, and the third information. For example, the media guidance application may add a condition to the query that requires that any matching media asset match at least one of the second information and the third information.

In some embodiments, the media guidance application may, when modifying, based on the first information, the second query, add, to the second query, another Boolean operator and the first information. For example, the second query may require that any matching media asset match at least one of the second information and the third information. The media guidance application may modify the second query to require that any matching media asset match the first information and at least one of the second information and the third information.

In some embodiments, the media guidance application may determine whether the third information is associated with the first information type or the second information type by performing the following actions. The media guidance application may retrieve a plurality of data structures associated with a plurality of information types, respectively. For example, each information type may have a corresponding data structure. Each data structure may include a plurality of fields. The fields may include a field for information identification values. For example, the "genre" information type may store information identification values for "romance," "comedy," "horror," and other suitable information identification values. In some embodiments an information identification value may be an alphanumeric string. Additionally or alternatively, the information identification value may be a numeric string, a letter string, or another suitable value.

The media guidance application may locate, in metadata associated with the user's input, an information identification value associated with the third information. For example, the media guidance application may retrieve a data structure associated with the third information received via user input, and extract the information identification string associated with the third information.

The media guidance application may compare the extracted information identification value with information identification values associated with each information type to determine the associated information type. Specifically, the media guidance application may compare a field, of each data structure of the plurality of data structures, that stores one or more information identification values with the identification value associated with the third information, wherein the one or more information identification values correspond to information identification values associated with each information type, respectively. For example, the media guidance application may iterate through each data structure and access a field in each data structure that stores information identification values associated with the corresponding data structure. The media guidance application may compare the values in the field with the information identification values associated with the third information.

The media guidance application may identify an information type that matches the third information as a result of the comparison. Specifically, the media guidance application may determine, based on the comparing, whether the third information is associated with the first information type or the second information type. For example, the third information received via user input may correspond to the "genre" of comedy. The media guidance application may determine an information identification value associated with comedy (e.g., value of ID301). The media guidance application may compare the information identification value field associated with each information type with the value for comedy. Thus, the "genre" information type, in this embodiment, will have an associated value of ID301, which will be matched by the media guidance application.

BRIEF DESCRIPTION OF THE DRAWINGS

FIG. 2 shows two illustrative display screens where user input has been received, in accordance with some embodiments of the disclosure;

FIG. 8 is a flowchart of illustrative steps for filtering media assets, in accordance with some embodiments of this disclosure;

DETAILED DESCRIPTION

Figure 1:
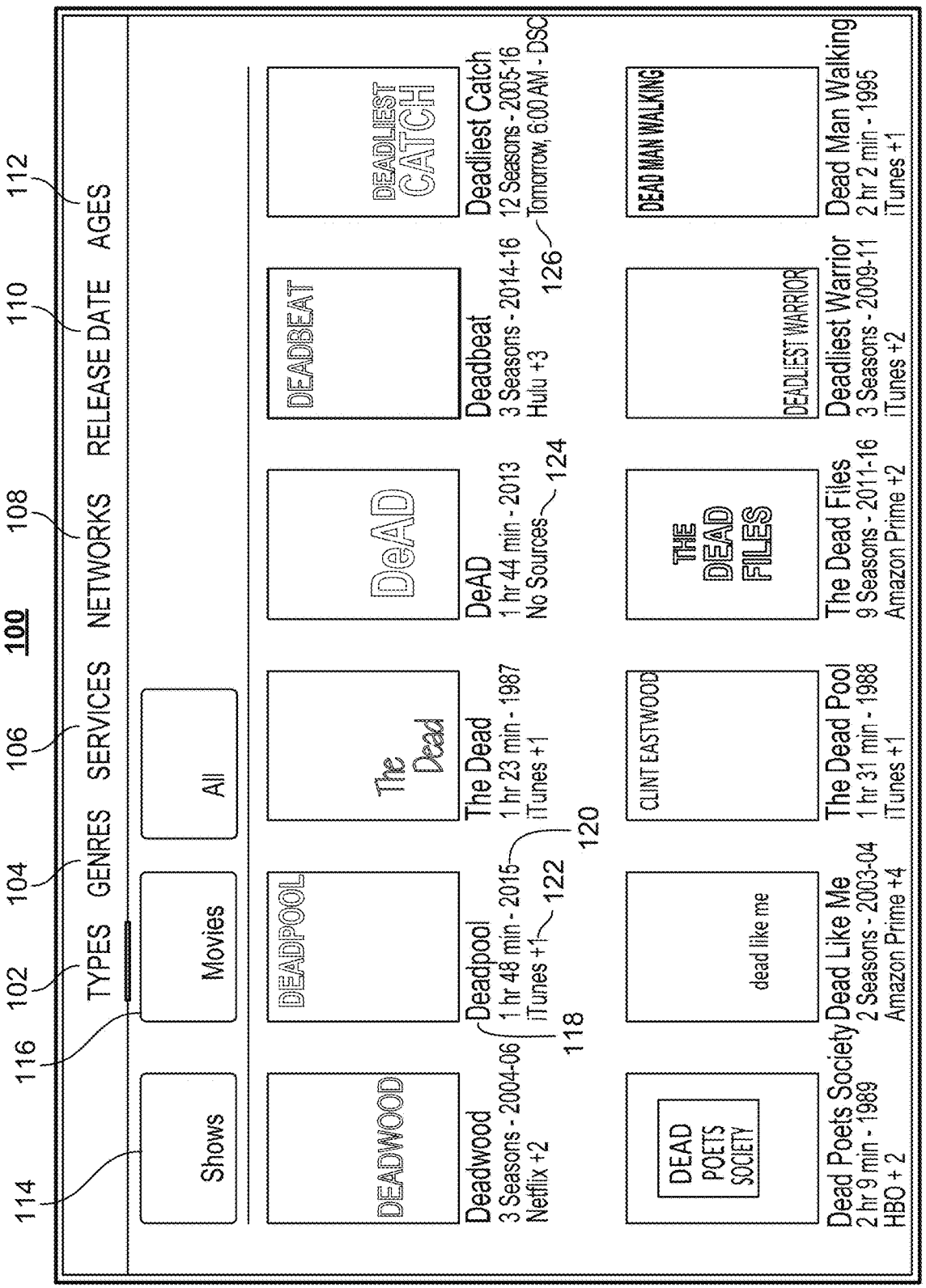
FIG. 1 shows an illustration of a display screen, in accordance with some embodiments of the disclosure.

In some embodiments, a media guidance application may be configured (e.g., via control circuitry 604) to process different types of filters and filter media assets differently based on the different types. The media guidance application may receive (e.g., via user input interface 610) two user selections of two filter options from two different types of filters, respectively. The first filter may be a division filter, where the division filter is a filter configured for selecting those media assets that match each selected filter option associated with the division filter. The second filter may a combination filter, where the combination filter is a filter configured for selecting those media assets that match at least one selected filter option associated with the combination filter.

The media guidance application when receiving (e.g., via user input interface 610) a third user selection of a third filter option processes the filters differently. If the third filter option is an option associated with the first filter (e.g., a filter option from a plurality of filter options for the first filter), the media guidance application may generate for display (e.g., via control circuitry 604 on display 612) media asset identifiers corresponding to those media assets that match all filter options (first filter option, second filter option, and third filter option) received from the user. If, however, the third filter option is an option associated with the second filter, the media guidance application may generate for display (e.g., via control circuitry 604 on display 612) those media asset identifiers that correspond to media assets that match at least one of the combination of (1) the first filter option and the second filter option, and (2) the first filter option and the third filter option.

The media guidance application may receive and process a filter option for a division filter. Specifically, the media guidance application may receive a first user selection of a first filter option associated with a first filter that is configured as a division filter, where the division filter is a filter configured for selecting those media assets that match all filter options associated with the division filter. For example, a "Genre" filter may include filter options for "Comedy," "Romance," "Action," "Adventure," and other suitable filter options. By default, the "Genre" filter may be configured as a division filter where if the media guidance application receives user selections of a "Comedy" filter option and a "Romance" filter option, the media guidance application may process these filter options to select media assets that match both the "Comedy" genre and the "Romance" genre (e.g., filter for Romantic Comedies).

For example, the media guidance application may retrieve the filter options from storage (e.g., storage 608) and also the search string associated with the filter option.

FIG. 1 shows an exemplary display 100 of different filters and some examples of filter options as well as metadata information associated with media assets. "Types" filter 102 has been highlighted in display 100 and shows two different filter options or types of media assets. Selection of filter option 114 instructs the media guidance application to match shows while filter option 116 instructs the media guidance application to match movies. Other filters that are displayed on display 100 include filter 104 for "Genres," filter 106 for "Services," filter 108 for "Networks," filter 110 for "Release Date," and filter 112 for "Ages."

FIG. 1 further illustrates other metadata generated for display (e.g., via control circuitry 604 on display 612) by the media guidance application. Media asset titles (e.g., title 118) are displayed. Also, run time and release date are displayed (e.g., run title and release date 120). In addition the sources from which the media assets are available are displayed (e.g., sources 122). In addition, FIG. 1 depicts indications of media assets that are not available from any source (e.g., "No Sources" indication 124).

The media guidance application may receive and process a filter option for a combination filter. Specifically, the media guidance application may receive (e.g., from user input interface 610) a second user selection of a second filter option associated with a second filter that is configured as a combination filter, where the combination filter is a filter configured for selecting those media assets that match at least one filter option associated with the combination filter. For example, a "Services" filter may include filter options for Hulu®, Netflix®, iTunes®, Amazon Prime®, and other suitable filter options. By default, the "Services" filter may be configured as a combination filter where if the media guidance application receives user selections of a Hulu® filter option and a Netflix® filter option, the media guidance application may process these filter options to select media assets that match either the Hulu® service provider or the Netflix®.

For example, the media guidance application may retrieve the filter options from storage (e.g., storage 608) and also the search string associated with the filter option.

FIG. 2 shows an exemplary display screen 200 that depicts multiple user selections received by the media guidance application. Display screen 200 of FIG. 2 depicts that filter option 202 and filter option 204 have been received by the media guidance application corresponding respectively to "Shows" and "Adventure." Indicator 206 indicates that 812 matches have been found for adventure shows. In some embodiments, the indicator may indicate a combination of shows that have been found and separately adventure media assets that have been found. Option 208 of display screen 200 of FIG. 2 enables the user to instruct the media guidance application to clear all selected filter options and option 210 enables the user to instruct the media guidance application to sort matched media asset by a specific sorting criteria (e.g., popularity).

The media guidance application may receive (e.g., via user input interface 610) a third user selection of a third filter option and perform actions based on which filter the third filter options is associated with.

Based on the third filter option being associated with the first filter, the media guidance application may generate for display (e.g., via control circuitry 604 on display 612) media asset identifiers corresponding to those media assets that match all of the first filter option, the second filter option, and the third filter option. For example, if the media guidance application receives "Netflix®" as the first filter option, "Comedy" as the second filter option and "Romance" as the third filter option, the media guidance application may match media assets that are available from Netflix® that match the "Comedy" genre and the "Romance" genre (i.e. romantic comedies available on Netflix®). The media guidance application may match the metadata associated with each media asset (e.g., metadata that is stored in a database) to the comedy genre and in the same way match the Netflix® service.

For example, the media guidance application may transmit a query to a database so that the database may return all comedies and also do the same for each filter option. The media guidance application may generate for display a result set of the queries in accordance with different filter types (e.g., based on whether some filters are division filters while others are combination filters.

Based on the third filter option being associated with the second filter, the media guidance application may generate for display (e.g., via control circuitry 604 on display 612)

those media asset identifiers that correspond to media assets that match at least one of the first filter option and the second filter option, and the first filter option and the third filter option. For example, if the media guidance application receives (e.g., via user input interface 610) "Netflix®" as the first filter option, "Comedy" as the second filter option and "Amazon Prime®" as the third filter option, the media guidance application may match media assets that are available from Netflix® that match the "Comedy" genre media assets media assets available from Amazon Prime® that match the "Comedy" genre (i.e. comedies available on Netflix® and also comedies available from Amazon Prime®).

For example, the media guidance application may transmit a query to a database so that the database may return all comedies and also do the same for each filter option. The media guidance application may generate for display a result set of the queries in according with different filter types (e.g., based on whether some filters are division filter while others are combination filters.

In some embodiments, the media guidance application may reconfigure a division filter as a combination filter. Specifically, the media guidance application may reconfigure the first filter as a combination filter, and generate for display those media asset identifiers corresponding to media assets that match at least one of the first filter option and the third filter option, and the first filter option and the third filter option according to the reconfigured first filter. For example, the media guidance application may update metadata associated with each filter to change the type of filter to a division from a combination and vice versa as needed. When the media guidance application applies (e.g., via control circuitry 604) filter options for each filter, the media guidance application may retrieve the filter type and process the filter options according to the filter type.

In some embodiments, the media guidance application may reconfigure the first filter in response to determining that no media assets match both the first filter option and the third filter option. For example, if there are no romantic comedies available, the media guidance application may process the filter options to match romance movies and separately comedies.

In some embodiments, the third filter option may be associated with a completely different filter. The media guidance application may in response to determining that the third filter option is associated with a third filter that is different from the first filter and the second filter, generate for display (e.g., via control circuitry 604 on display 612) those media asset identifiers that correspond to media assets that match both the first filter option and the third filter option, and those media asset identifiers that match both the second filter option and the third filter option according to the first filter, the second filter, and the third filter. For example, the media guidance application may receive a user selection of a first filter option of "Comedy," a second filter option of "Netflix®," and a third filter option of "Children," the media guidance application may match comedies for children and separately match comedies available from Netflix®

Figure 3:
FIG. 3 shows an illustration of a display screen where additional user input has been received, in accordance with some embodiments of the disclosure.

FIG. 3 illustrates a third filter and the corresponding filter options that may be available to a user for selection in combination with other filter options. It should be noted that present option 306 corresponding to "Children" is selected and in combination with other selected filter options, no results are found. This is indicated by indicator 302. Other filter options include Toddlers 302, Teens 308, Adults 310, and Not Rated 312.

In some embodiments, the media guidance application may reconfigure a combination filter into a division filter. Specifically, the media guidance application may reconfigure the second filter into a division filter, and generate for display those media asset identifiers corresponding to media assets that match all of the first filter option, the second filter option, and the third filter option according to the reconfigured second filter. For example, a "Genre" filter may include filter options for "Comedy," "Romance," "Action," "Adventure," and other suitable filter options. By default, the "Genre" filter may be configured as a combination filter where if the media guidance application receives user selections of a "Comedy" filter option and a "Romance" filter option, the media guidance application may process these filter options to select media assets that match either the "Comedy" genre and the "Romance" genre (e.g., filter for Romantic Comedies). When the filter is reconfigured into a division filter, the media guidance application may select media assets that match both the "Comedy" genre and the "Romance" genre (e.g., filter for romantic comedies).

In some embodiments, the media guidance application may reconfigure the second filter in response to determining that a number of media assets match both the first filter option and the third filter option exceeds a predefined threshold. For example, if too many results are returned (e.g., more than one hundred), the media guidance application may present less results and reconfigure the filter.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Additionally or alternatively, the concepts described above may be implemented using the following nomenclature. Specifically, a filter as described above may be used interchangeably with an information type that will be described below. Also, a filter option as described above may be used interchangeably with information received via user input. The media guidance application may take the following actions to efficiently and flexibly present desired media assets to the user.

The media guidance application may receive user input of a first information, a second information and a third information. For example, the media guidance application may reside on a device that is associated with a display screen. The media guidance application may generate on the display screen a display similar to display 100 (FIG. 1). FIG. 1 depicts indicators 114 and 116 representing "shows" and "movies." If the user selects one of those indicators, the media guidance application may receive information associated with the indicator (e.g., information indicator that the user is interested in searching for movies). The media guidance application may receive selections of multiple indicators that may be transformed into different information (e.g., the first information, the second information, and the third information). It should be noted that various other suitable indicators may be presented to the user. For example, indicators for different genres (e.g., romance, comedy, action, drama, etc.), indicators for different networks (e.g., NBC®, ABC®, FOX®) and other suitable indicators may be presented to the user.

The media guidance application may determine a respective information type corresponding to the different information received via user input. Specifically, the media guidance application may determine that the first information is associated with a first information type and that the second information is associated with a second information type. The media guidance application may determine whether the third information is associated with the first information type or the second information type. For example, indicators 102, 104, 106, 108, 110, and 112 may be presented to the user. The presented indicators may be associated with information types of types, genres, services, network, release dates, and ages, respectively. Specifically, a data structure may be generated for every information type. The data structure may include a field that stores identifiers of each information associated with the information type. The media guidance application may iterate through each information type and compare the values in the field with an identifier of the first information received via user input and determine which information type is associated with the first information. The media guidance application may perform a similar process for the second information and the third information to determine which information type or type is associated with the first information, the second information, and the third information, respectively.

In response to determining that the third information is associated with the first information type, the media guidance application may take the following actions. For example, the media guidance application may have iterated through each information received via user input, and determined that the first information is associated with the first information type and the second information is associated with the second information type. The media guidance application may have stored the results those determinations. The media guidance application may repeat the process in relation to the third information and store the result. The media guidance application may compare the stored result for the third information with the stored result of the first information and second information to determine that the third information is associated with the same information type as the first information (e.g., the first information type). In response, the media guidance application may take the following actions.

The media guidance application may obtain instructions associated with the first information type that instruct the media guidance application to search for media assets that match each different information that was received via user input. Specifically, the media guidance application may receive instructions associated with the first information type to generate a query for retrieving media asset identifiers corresponding to media assets that match each information that (1) was input by the user and (2) is associated with the first information type. For example, each data structure described above that is associated with a respective input type may include a field that stores instructions associated with the first information type. The media guidance application may retrieve those instructions for use in generating a query based on the first information type.

The media guidance application may, based on the instructions, generate a query that combines the received different information of the first information type. The query may search for media assets that match each information of the first information type. Specifically, the media guidance application may generate, based on the instructions associated with the first information type, a first query for a first set of media assets identifiers corresponding to media assets that match each of the first information and the third information. For example, the media guidance application may interpret the instructions associated with the first information type. The media guidance application may connect to a database that will be processing the first query and determine the query language that is supported by the database. The media guidance application may further determine a table name that will be queried (e.g., by reading the table name from a configuration). The media guidance application may use that information together with the first information and the third information to create the first query. The first query may be similar to:

select * from $table where $first_information_type=
$first_information AND $first_information_type=
$third_information where
$ indicates a variable name.

The media guidance application may modify the generated first query in order to combine the information of the first information type with the second information received via user input. Specifically, the media guidance application may modify, based on the second information, the first query for retrieving a modified first set of media asset identifiers, each media asset identifier of the modified first set corresponding to a respective media asset that matches each of the second information, the first information, and the third information. For example, the media guidance application may retrieve the generated query (e.g., the above query) and combine it with the second information. The resulting query may be similar to:

select * from $table where
$first_information_type=$first_information
AND $first_information_type=$third_information AND
$second_information_type=$second_information.

The media guidance application may use the first query to retrieve results for the user. Specifically, the media guidance application may retrieve, based on the first query, the modified first set of media asset identifiers. For example, the media guidance application may transmit the first query to a database and, receive from the database media asset identifiers corresponding to media assets that match the first query. Display screen 200 of FIG. 2 may illustrate one possible display screen illustrating results of the query together with information received via user input. Icon 212 may illustrate an option associated with the first information received via user input, while icon 202, alternatively to illustrating a filter option, may illustrate an option associated the second information received via user input, while icon 204, may, alternatively to illustrating another filter option, illustrate an option associated with the third information received via user input.

In response to determining that the third information is associated with the second information type, the media guidance application may take the following actions.

The media guidance application may obtain instructions associated with the second filter that instruct the media guidance application to search for media assets that match at least one different information that was received via user input. Specifically, the media guidance application may receive instructions associated with the second information type to generate a query for media asset identifiers corresponding to media assets that match at least one information that (1) was input by the user and (2) is associated with the second information type. As described above, each information type may have an associated data structure that stores metadata associated with the information type. The metadata may include instructions on how to combine different information of the information type. The media guidance application may retrieve those instructions for use in generating a query based on the first information type.

The media guidance application may generate a query based on the instructions for media asset identifiers corresponding to media assets that match at least one of the second information and the third information (e.g., media assets available on Netflix® or on Amazon Prime®). Specifically, the media guidance application may generate, based on the instructions associated with the second information type, a second query for a second set of media asset identifiers, each media asset identifier of the second set corresponding to a respective media asset that matches at least one of the second information and the third information. For example, the media guidance application may interpret the instructions associated with the second information type. The media guidance application may connect to a database that will be processing the second query and determine the query language that is supported by the database. The media guidance application may further determine a table name that will be queried (e.g., by reading the table name from a configuration). The media guidance application may use that information together with the second information and the third information to create the second query. The query may be similar to:

select * from $table where $second_information_type=
$second_information OR $second_information_type=
$third_information where $ indicates a variable name.

The media guidance application may modify the second query to incorporate the first information into the query. Specifically, the media guidance application may modify, based on the first information, the second query for retrieving a modified second set of media asset identifiers, each media asset identifier of the modified second set corresponding to a respective media asset that matches the first information and at least one of the second information and the third information. In following the example above, the media guidance application may retrieve the generated query (e.g., the above query) and combine it with the first information. The resulting query may be similar to:

select * from $table where ($second_information_type=$second_information OR
        $second_information_type=$third_information)
    AND $first_information_type=$first_information.

The media guidance application may use the second query to retrieve results for the user. Specifically, the media guidance application may retrieve, based on the second query, the modified second set of media asset identifiers. Display screen 250 of FIG. 2 may illustrate one possible display screen illustrating results of the query together with information received via user input. Icon 256 may illustrate an option associated with the first information received via user input, while icon 252 may illustrate an option associated the second information received via user input, while icon 254, may illustrate an option associated with the third information received via user input.

In some embodiments, the media guidance application may, in response to determining that the third information is associated with the first information type, take the following actions. The media guidance application may determine whether a number of media asset identifiers in the modified first set of media asset identifiers exceeds a threshold. For example, the media guidance application may have retrieved too few (e.g., zero) media asset identifiers based on the first query. Thus, the user received no results for the search criteria. For example, FIG. 3 may exemplify one display screen associated with no results being found based on the combination of the first information, the second information, and the third information. Icon 302 may inform the user that no matches have been found.

The media guidance application may in response to determining that the number of media asset identifiers in the modified first set doesn't exceed the threshold, modify the query to expand the number of search results. The media guidance application may modify the query by changing the query to search for media assets that match the second information and at least one of the first information and the third information. Specifically, the media guidance application may, in response to determining that the number of media asset identifiers in the modified first set of media asset identifiers does not exceed the threshold, modify the first query to retrieve a third set of media asset identifiers, each media asset identifier in the third set corresponding to respective media assets that matches the second information and at least one of the first information and the third information. For example, the media guidance application may modify the first query illustrated above to:

select * from $table where ($first_information_type=$first_information
    OR $first_information_type=$third_information) AND
    second_information_type=$second_information.

In some embodiments, the media guidance application may, in response to determining that the third information is associated with the second information type, perform the following actions. The media guidance application may determine whether a number of media asset identifiers in the modified second set of media asset identifiers exceeds a threshold. For example, the media guidance application may have retrieved too many (e.g., 8,000) media asset identifiers based on the second query.

The media guidance application may in response to determining that the number of media asset identifiers in the modified second set exceeds the threshold, modify the query to narrow the number of search results. The media guidance application may modify the query by changing the query to search for media assets that match each of the second information, the first information, and the third information. For example, the media guidance application may modify the second query illustrated above to:

select * from $table where ($second_information_type=$second_information AND $second_information_type=$third_information) AND
        first_information_type=$first_information.

In some embodiments, the media guidance application may determine the threshold based on capabilities of a display. Specifically, the media guidance application may determine, based on capabilities of a display and a size associated with a respective indicator corresponding to each media asset identifier in the third set of media asset identifiers, a number of indicators of the media asset identifiers included in the modified second set of media asset identifiers that may be displayed simultaneously on the display. For example, the media guidance application may determine the highest resolution that the display screen can support. The media guidance application may also determine the size of each indicator associated with a respective media asset identifier. Based on that information, the media guidance application may determine how many indicators can fit in a display screen. If the number of media asset identifiers in the modified second set is bigger than the number that can fit on a display screen simultaneously, the media guidance application may narrow the result set by modifying the second query, as described above.

In some embodiments, the instructions associated with an information type may include the Boolean operator for combining the different information received via user input. Specifically, the media guidance application may, when receiving instructions associated with the second information type to generate a query for retrieving media asset identifiers corresponding to media assets that match each information that (1) was input by the user and (2) is associated with the second information type, retrieve from a data structure associated with the first information type a Boolean operator for generating the second query. For example, the data structure described above that stores metadata associated with the respective information type may store in the instructions field, the Boolean operator.

In some embodiments, the Boolean operator may be one of AND, OR, Exclusive OR, AND NOT, and NOT. For example, each information type may be associated with one of these Boolean operators that instruct the media guidance application how information associated with each information type is to be combined.

In some embodiments, the media guidance application may add, to the second query, two criterions (e.g., the second information and the third information) connected with the Boolean operator corresponding to the information type. Specifically, the media guidance application may, when generating, based on the instructions associated with the second information type, the second query, add, to the second query, the second information, the Boolean operator, and the third information. For example, the media guidance application may add a condition to the query that requires that any matching media asset match at least one of the second information and the third information. The resulting second query may be a query similar to the second query described above.

In some embodiments, the media guidance application may, when modifying, based on the first information, the second query, add, to the second query, another Boolean operator and the first information. For example, the second query may require that any matching media asset match at least one of the second information and the third information. The media guidance application may modify the second query to require that any matching media asset match the first information and at least one of the second information and the third information. The resulting modified second query may be a query similar to the modified second query described above.

In some embodiments, the media guidance application may determine whether the third information is associated with the first information type or the second information type by performing the following actions. The media guidance application may retrieve a plurality of data structures associated with a plurality of information types, respectively. For example, each information type may have a corresponding data structure. Each data structure may include a plurality of fields. The fields may include a field for information identification values. For example, the "genre" information type may store information identification values for "romance," "comedy," "horror," and other suitable information identification values. In some embodiments an information identification value may be an alphanumeric string. Additionally or alternatively, the information identification value may be a numeric string, a letter string, or another suitable value.

The media guidance application may locate, in metadata associated with the user's input, an information identification value associated with the third information. For example, the media guidance application may retrieve a data structure associated with the third information received via user input, and extract the information identification string associated with the third information.

The media guidance application may compare the extracted information identification value with information identification values associated with each information type to determine the associated information type. Specifically, the media guidance application may compare a field, of each data structure of the plurality of data structures, that stores one or more information identification values with the identification value associated with the third information, wherein the one or more information identification values correspond to information identification values associated with each information type, respectively. For example, the media guidance application may iterate through each data structure and access a field in each data structure that stores information identification values associated with the corresponding data structure. The media guidance application may compare the values in the field with the information identification values associated with the third information.

The media guidance application may identify an information type that matches the third information as a result of the comparison. Specifically, the media guidance application may determine, based on the comparing, whether the third information is associated with the first information type or the second information type. For example, the third information received via user input may correspond to the "genre" of comedy. The media guidance application may determine an information identification value associated with comedy (e.g., value of ID301). The media guidance application may compare the information identification value field associated with each information type with the value for comedy. Thus, the "genre" information type, in this embodiment, will have an associated value of ID301, which will be matched by the media guidance application.

Figures 4, 5:
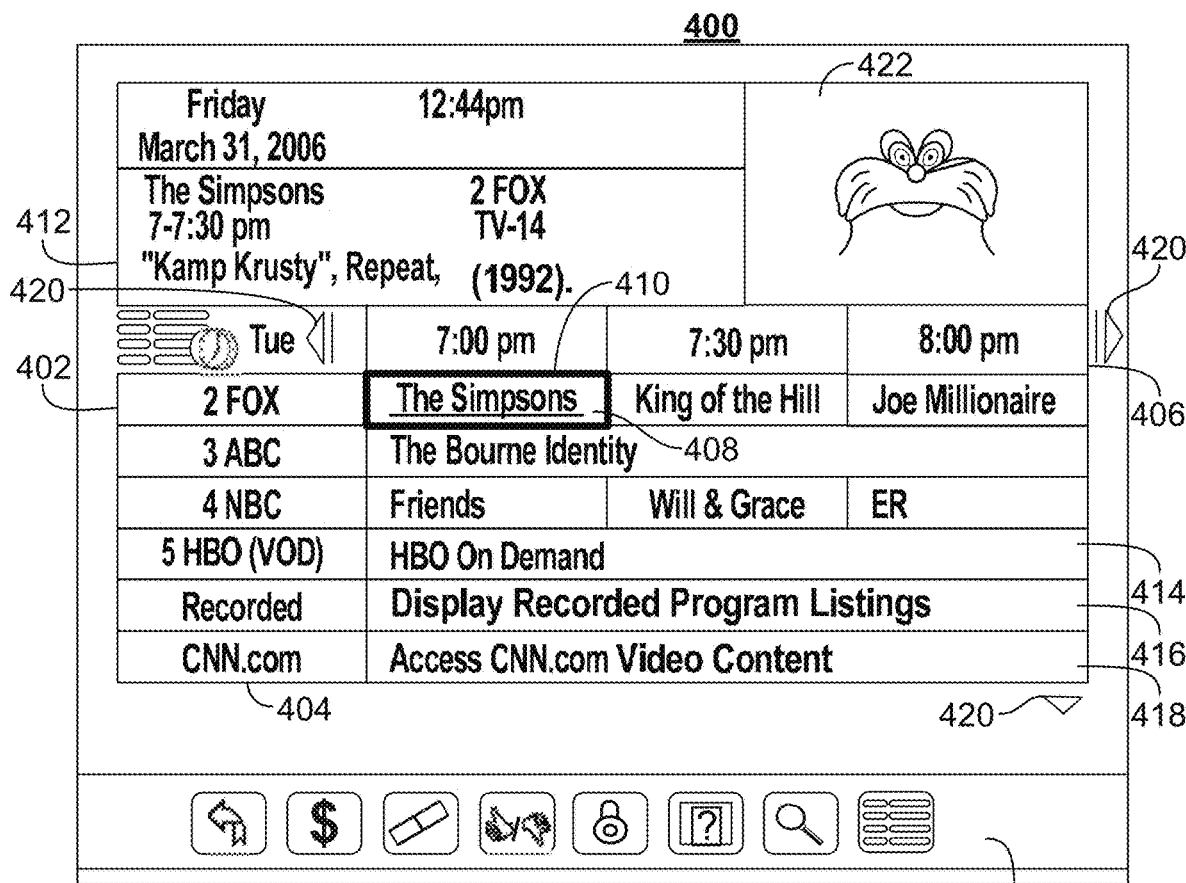
FIG. 4 shows an illustrative embodiment of a display screen that may be used to provide media guidance application listings and other media guidance information, in accordance with some embodiments of the disclosure.
FIG. 5 shows another illustrative embodiment of a display screen that may be used to provide media guidance application listings, in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
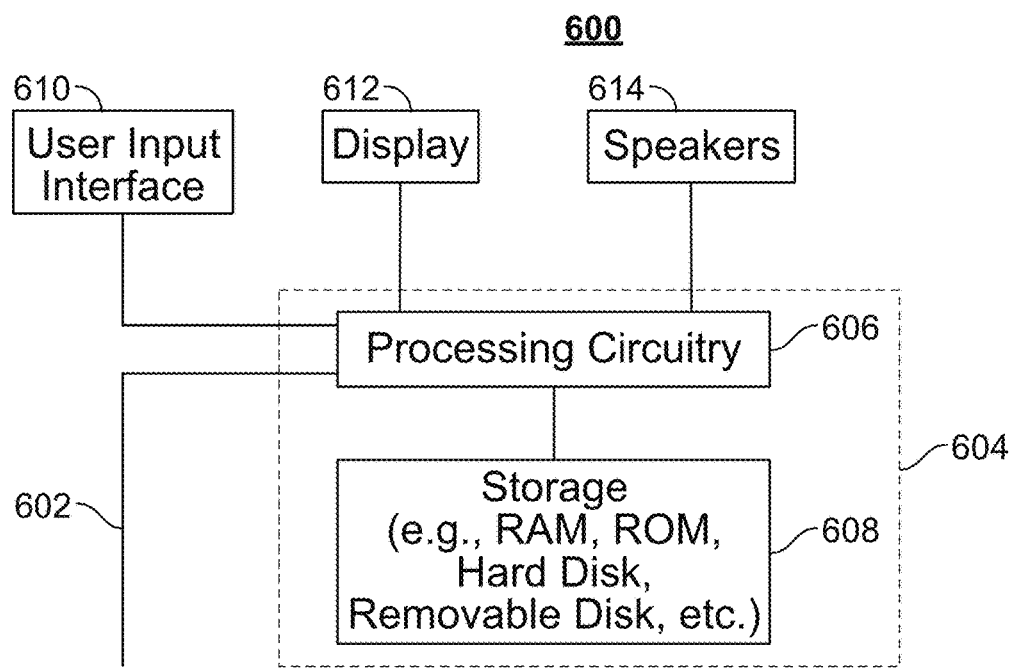
FIG. 6 is a block diagram of an illustrative device, in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
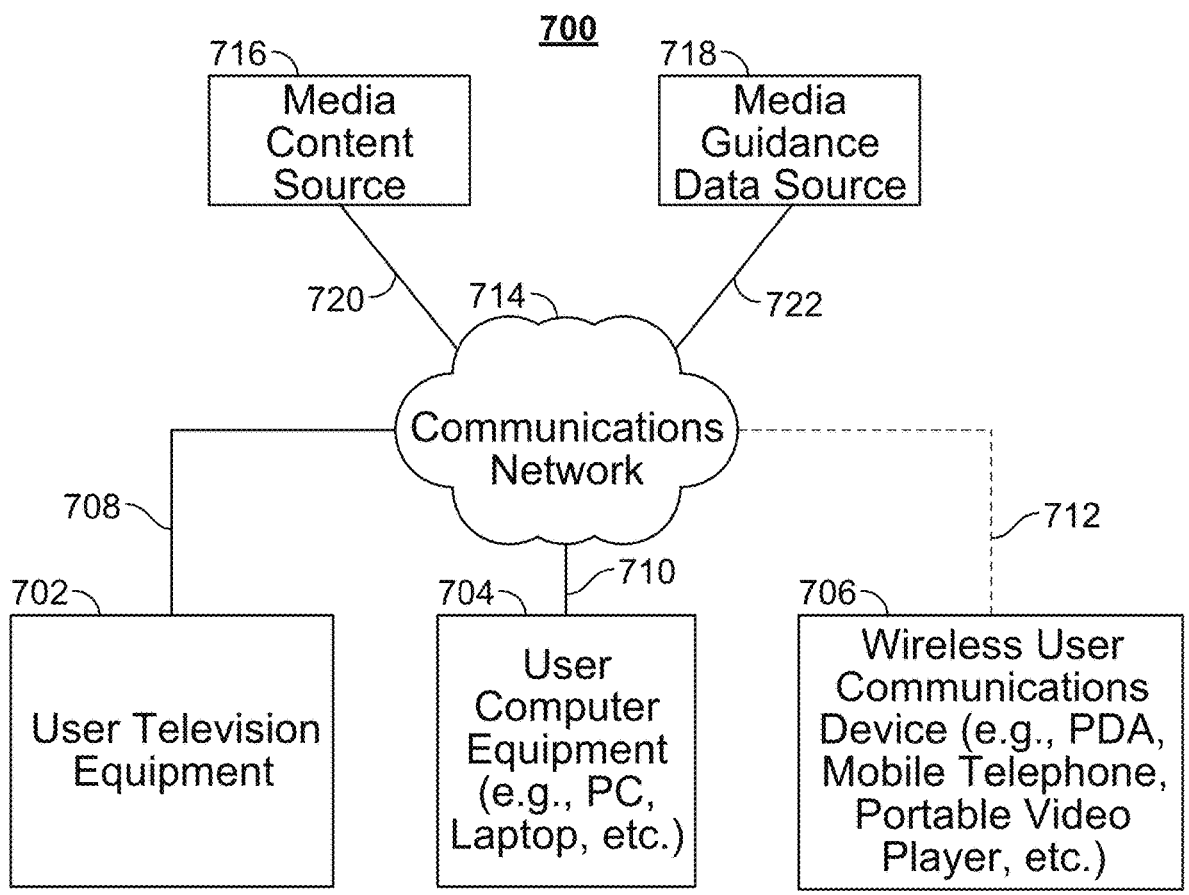
FIG. 7 is a block diagram of an illustrative media system, in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIG. 8 is a flowchart of illustrative steps for filtering media assets, in accordance with some embodiments of the disclosure. For example, a media guidance application implementing process 800 may be executed by control circuitry 604 (FIG. 6) to display graphics behind media asset identifiers when they are presented to a user on a display screen (e.g, on display 612 (FIG. 6)).

Process 800 begins at 802, where control circuitry 604 receives (e.g., via user interface 610) a user selection of a first filter. The first filter is a division filter, where the division filter is a filter configured for selecting those media assets that match each selected filter option associated with the division filter. The first filter may be preconfigured to be a division filter and stored (e.g., in storage 608). The first filter may include an associated data structure that stores a filter type, filter name, associated filter options, and other suitable information. Each filter option may also be associated with a data structure which includes fields for the name of the filter option, the associated filter or filters, and any keywords associated with the filter option that are used by the media guidance application to filter media assets.

At 804, control circuitry 604 receives a user selection of a second filter. The second filter is a combination filter, where the combination filter is a filter configured for selecting those media assets that match at least one selected filter option associated with the combination filter. The second filter may also have an associated data structure that includes the same fields as the data structure associated with the first filter. However, the data structure associated with the second filter may have different field values (e.g., the type field indicating that the second filter is a combination filter).

At step 806, control circuitry 604 receives (e.g., via user input interface 610) a third user selection of a third filter option. At step 808, if the third filter option is an option associated with the first filter (e.g., a filter option from a plurality of filter options for the first filter), the media guidance application may generate for display media asset identifiers corresponding to those media assets that match all filter options (first filter option, second filter option, and third filter option) received from the user. For example, control circuitry 604 may access the data structures associated with first, second, and third filter options and retrieve from those data structure keywords associated with each filter option, respectively. Control circuitry 604 may apply the filter options according to filter types to generate for display matching media assets.

At step 810, if the third filter option is an option associated with the second filter, the media guidance application may generate for display those media asset identifiers that correspond to media assets that match at least one of the combination of (1) the first filter option and the second filter option, and (2) the first filter option and the third filter option. For example, control circuitry 604 may access the data structures associated with first, second, and third filter options and retrieve from those data structure keywords associated with each filter option, respectively. Control circuitry 604 may apply the filter options according to filter types to generate for display matching media assets.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-7 could be used to perform one or more of the steps in FIG. 8.

Figure 11:
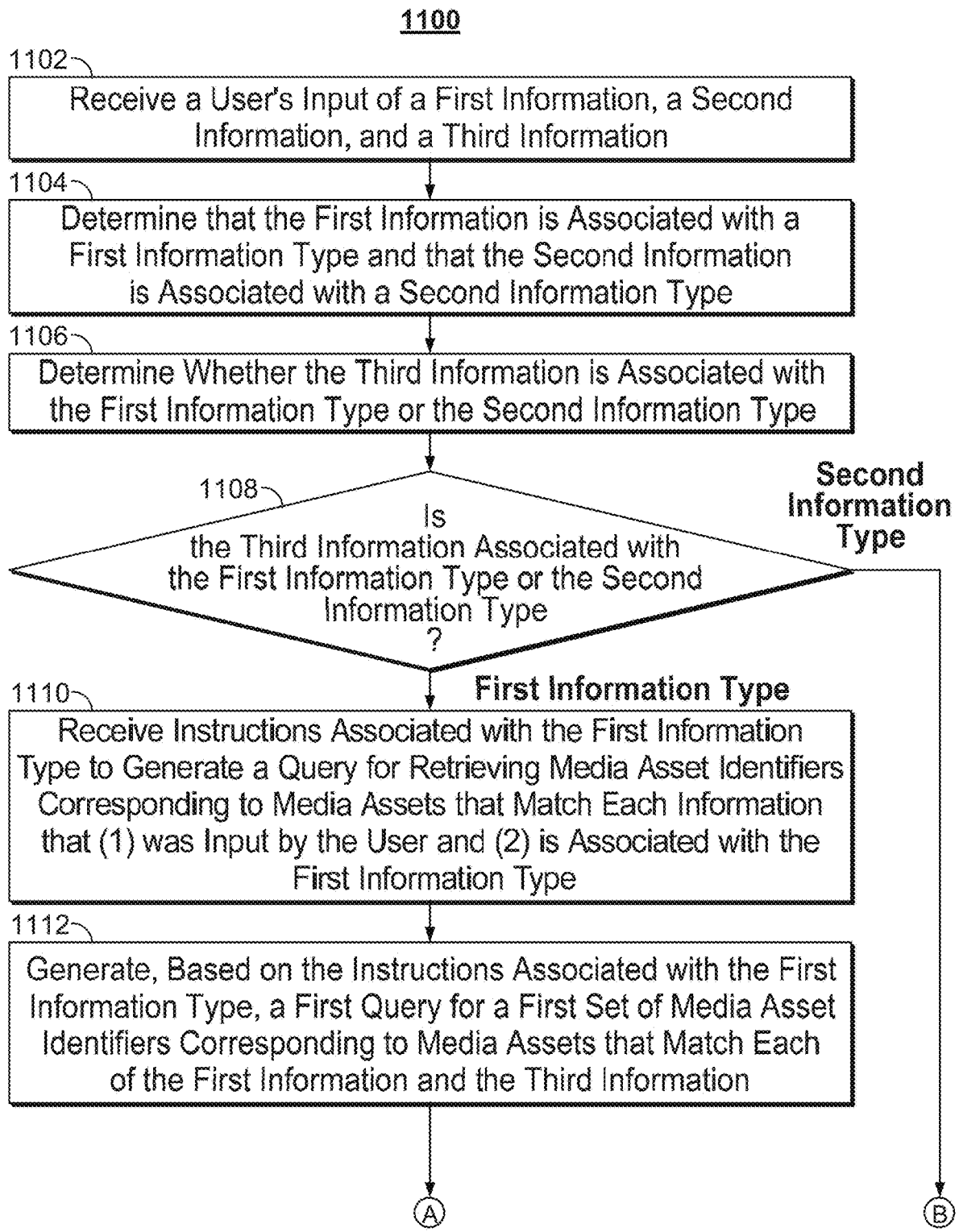
FIG. 11 depicts an illustrative process for building a query based on user input, in accordance with some embodiments of this disclosure.
Figure 11:
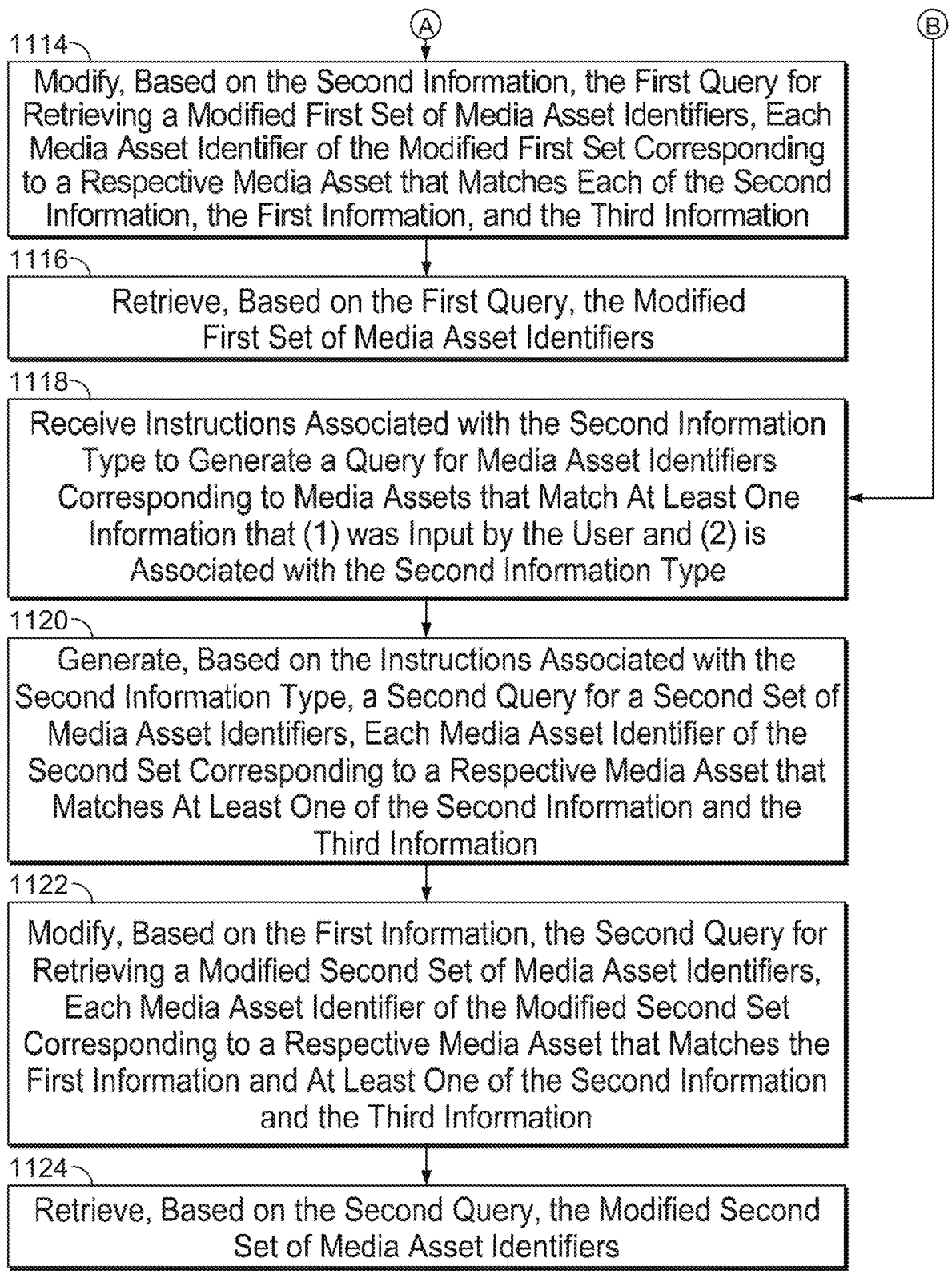

Other methods for providing a user with a flexible way to search for media assets or filter media assets is described herein. FIG. 11 depicts an illustrative process for building a query based on user input. The query returns media asset identifiers associated with media assets that the user desires to consume. At 1102, control circuitry 604 receives a user's input for a first information, a second information, and a third information. The control circuitry may receive the user's input from user input interface 610. It should be noted that user input may be received from a different device (e.g., user television equipment 702, user computer equipment 704, or wireless user communications device 706) and transferred to the device where the control circuitry resides.

At 1104, control circuitry 604 determines that the first information is associated with a first information type and that the second information is associated with the second information type. The control circuitry may perform this determination by comparing an appropriate field in the data structure associated with each information type with the user's input of the respective information, as described above.

At 1106, control circuitry 604 determines whether the third information is associated with the first information type or the second information type. The control circuitry may perform this determination by comparing appropriate information types determined for each information received via user input. At 1108, if the third information is associated with the first information type, process 1100 proceeds to action 1110.

At 1110, control circuitry 604 receives instructions associated with the first information type to generate a query for retrieving media asset identifiers corresponding to media assets that match each information that (1) was input by the user and (2) is associated with the first information type. The control circuitry may access a data structure associated with the first information type. The data structure may be located locally (e.g., in storage 608) or on a remote server (e.g., a server located at media content source 716 and/or media guidance data source 718). In some embodiments, the data structure may be located on a different user device (e.g., user television equipment 702, user computer equipment 704, or wireless user communications device 706). The control circuitry may identify a field in the data structure that includes the instructions and retrieve from the data structure the data within the identified field.

At 1112, control circuitry 604 generates, based on the instructions associated with the first information type, a first query for a first set of media asset identifiers corresponding to media assets that match each of the first information and the third information. For example, the control circuitry may parse the instructions obtained as a result of action 1110 and determine based on the parsed instructions (e.g., based on an associated Boolean operator). The control circuitry may generate the first query based on the parsed information and first information and the third information, as described above. The control circuitry may store the query in storage 608 or on another device (e.g., at media content source 716 and/or media guidance data source 718). In some embodiments, additionally or alternatively the control circuitry may store the first query on at least one of user television equipment 702, user computer equipment 704, and wireless user communications device 706).

At 1114, control circuitry 604 modifies, based on the second information, the first query for retrieving a modified first set of media asset identifiers, each media asset identifier of the modified first set corresponding to a respective media asset that matches each of the second information, the first information, and the third information. The control circuitry may perform the modification by retrieving the first query and adding to the query string the second information and an appropriate Boolean operator. At 1116, control circuitry 604 retrieves, based on the first query, the modified first set of media asset identifiers. As described above, the control circuitry can access a database that stores media guidance data (e.g., media asset metadata) and retrieve from the data, based on the first query, the appropriate media asset identifiers.

At 1108, if the third information is associated with the second information type, process 1100 proceeds to action 1118. At 1118, control circuitry 604 receives instructions associated with the second information type to generate a query for media asset identifiers corresponding to media assets that match at least one information that (1) was input by the user and (2) is associated with the second information type. The control circuitry may receive the instructions in a manner similar to the receipt of instructions in connection with action 1110.

At 1120, control circuitry 604 generates, based on the instructions associated with the second information type, a second query for a second set of media asset identifiers, each media asset identifier of the second set corresponding to a respective media asset that matches at least one of the second information and the third information. The control circuitry may perform this action in a manner similar to performing action 1112.

At 1122, control circuitry 604 modifies, based on the first information, the second query for retrieving a modified second set of media asset identifiers, each media asset identifiers of the modified second set corresponding to a respective media asset that matches the first information and at least one of the second information and the third information. The control circuitry may perform this action in a manner similar to performing action 1114.

At 1124, control circuitry 604 retrieves, based on the second query, the modified second set of media asset identifiers. The control circuitry may perform this action in a manner similar to performing action 1116.

Figure 9:
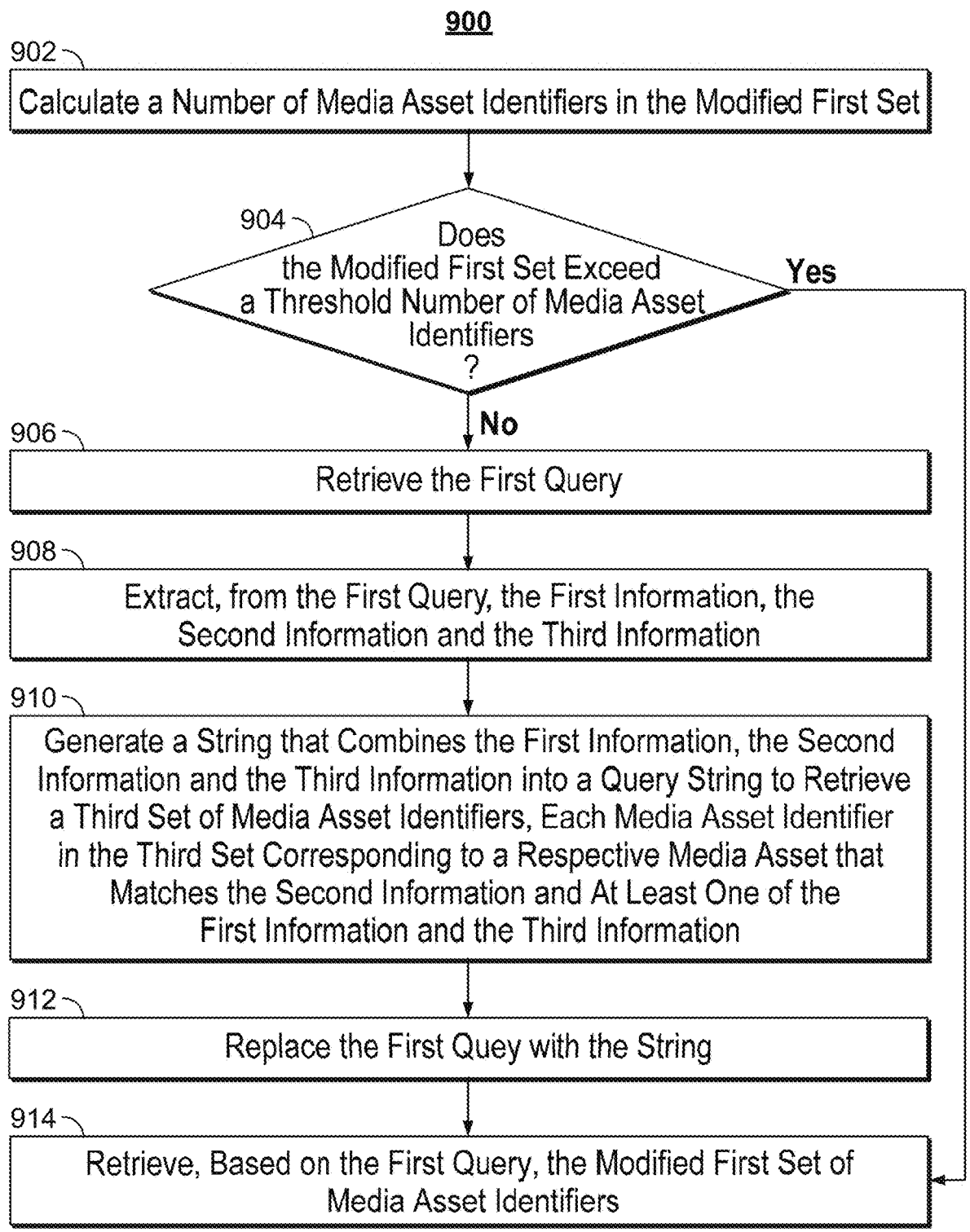
FIG. 9 depicts an illustrative process for modifying the query when there are not enough results, in accordance with some embodiments of this disclosure.

FIG. 9 depicts an illustrative process for modifying the query when there are not enough results. At 902, control circuitry 604 calculates a number of media asset identifiers in the modified first set. For example, the control circuitry may retrieve (e.g., from storage 608) a data structure associated with the modified first set. Additionally or alternatively, the control circuitry may retrieve the data structure from a remote server (e.g., remote server associated with media content source 716 and/or media guidance data source 718). The control circuitry may iterate through each media asset identifier in the data structure and maintain a count as the iteration proceeds. At the end of the iteration, the control circuitry may store (e.g., in storage 608) the count.

At 904, control circuitry 604 determines whether the modified first set exceeds a threshold number of media asset identifiers. The control circuitry may retrieve (e.g., from storage 608, from media content source 716, and/or media guidance data source 718) the threshold. The control circuitry may also retrieve the count stored as a result performing action 902. The control circuitry may compare the count with the threshold. If the modified first set exceeds the threshold number of media asset identifiers, process 900 moves to action 914, where control circuitry 604 retrieves, based on the first query, the modified first set of media asset identifiers. If the modified first set does not exceed the threshold number of media asset identifiers, process 900 moves to action 906. It should be noted that this threshold may represent the minimum number of media asset desired in the first set, while the threshold of process 1000 may represent a maximum number of media assets desired in the second set.

At 906, control circuitry 604 retrieves the first query. The control circuitry may retrieve the first query from storage 608, from media content source 716, or from media guidance data source 718. At 908, the control circuitry extracts, from the first query, the first information, the second information, and the third information. The control circuitry may perform this action by comparing each element of the first query with the received first information, second information, and third information.

At 910, control circuitry 604 generates a string that combines the first information, the second information, and the third information into a query string to retrieve a third set of media asset identifiers, each media asset identifier in the third set corresponding to a respective media asset that matches the second information and at least one of the first information and the third information. The media guidance application may generate the string by adding the appropriate Boolean operators to the query as described above.

At 912, control circuitry 604, replaces the first query with the string. For example, the control circuitry may override the variable that includes the first query (e.g., the first query string) with the string generated as a result of action 910. At 914, control circuitry 604 retrieves, based on the replaced first query, the modified first set of media asset identifiers. The control circuitry may perform this action by connecting to a database storing the metadata about media assets and transmitting the query to the database. The database may transmit back the media asset identifiers and other metadata associated with the appropriate media assets.

Figure 10:
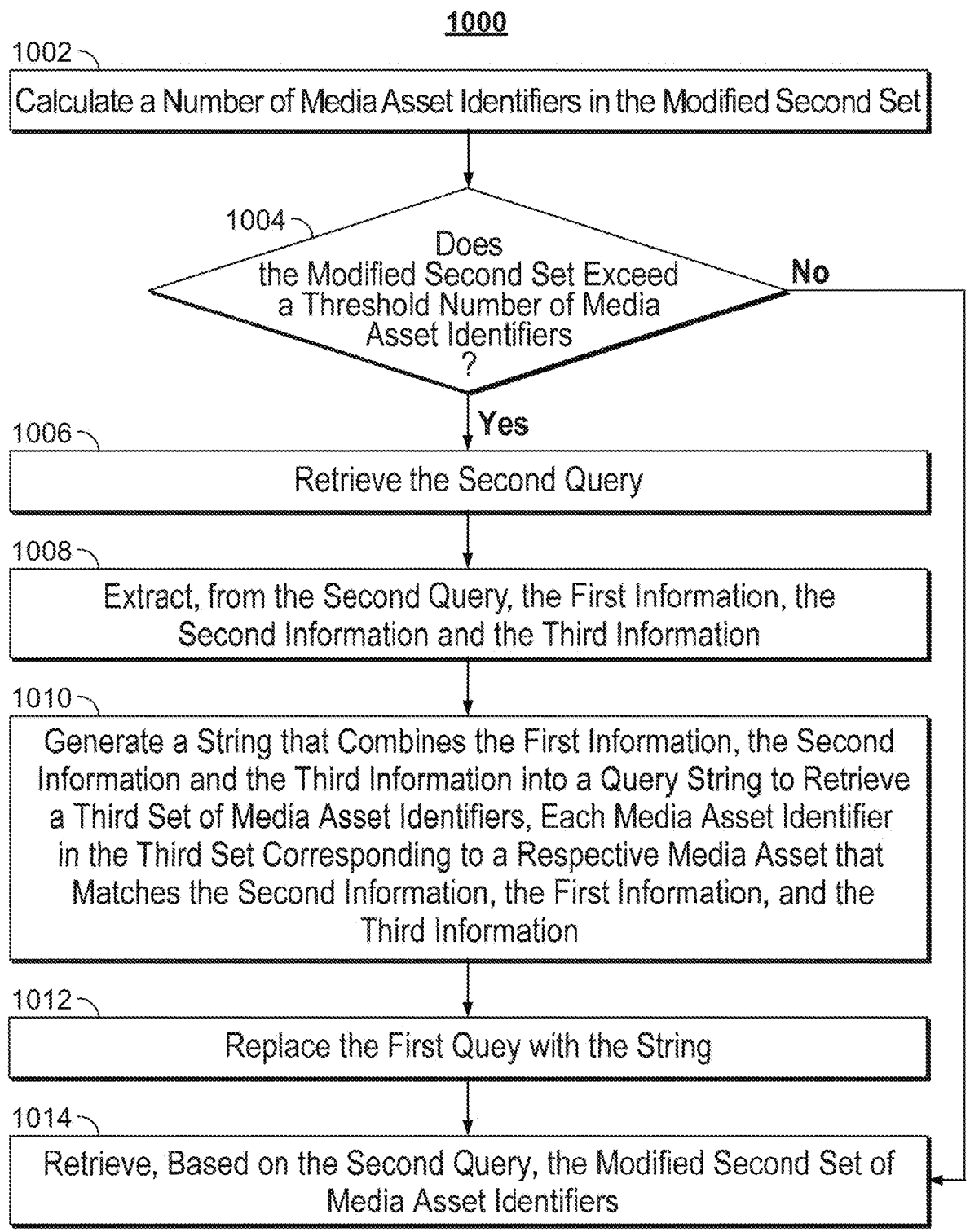
FIG. 10 depicts an illustrative process for modifying the second query when there are too many results, in accordance with some embodiments of this disclosure.

FIG. 10 depicts an illustrative process for modifying the second query when there are too many results. At 1002, control circuitry 604 calculates a number of media asset identifiers in the modified second set. The control circuitry may perform the calculation by using a method similar to a method described in connection with action 902.

At 1004, control circuitry 604 determines whether the modified second set exceeds a threshold number of media assets. It should be noted that this threshold may represent the maximum number of media asset desired in the second set, while the threshold of process 900 may represent a minimum number of media assets desired in the first set. The control circuitry may make the determination in a manner similar to the determination made at action 904.

At 1006, control circuitry 604 retrieves the second query. The control circuitry may retrieve the second query from storage 608, from media content source 716, or from media guidance data source 718. At 1008, the control circuitry extracts, from the second query, the first information, the second information, and the third information. The control circuitry may perform this action by comparing each element of the second query with the received first information, second information, and third information.

At 1010, control circuitry 604 generates a string that combines the first information, the second information, and the third information into a query string to retrieve a third set of media asset identifiers, each media asset identifier in the third set corresponding to a respective media asset that matches the second information, the first information, and the third information. The media guidance application may generate the string by adding the appropriate Boolean operators to the query as described above.

At 1012, control circuitry 604 replaces the second query with the string. For example, the control circuitry may override the variable that includes the second query (e.g., the second query string) with the string generated as a result of action 1010. At 1014, control circuitry 604 retrieves, based on the replaced second query, the modified second set of media asset identifiers. The control circuitry may perform this action by connecting to a database storing the metadata about media assets and transmitting the query to the database. The database may transmit back the media asset identifiers and other metadata associated with the appropriate media assets.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving a user query comprising first information, second information, and third information, wherein the user query comprises a first Boolean operator between the first information and the second information, and a second Boolean operator between the second information and the third information;
   retrieving a set of media asset identifiers based at least in part on the user query;
   calculating a first number of media asset identifiers in the set;
   determining whether the first number of media asset identifiers in the set is within a threshold range of a second number of media asset identifiers; and
   in response to determining that the first number of media asset identifiers in the set is not within the threshold range of the second number of media asset identifiers:
     extracting, from the user query, the first information, the second information, and the third information;

modifying the user query by modifying at least one of the first Boolean operator or the second Boolean operator; and retrieving a modified set of media asset identifiers based at least in part on the modified user query.

2. The method of claim 1, further comprising, further in response to determining that the first number of media asset identifiers in the set is not within the threshold range:

determining that the first number of media asset identifiers within the set is less than the second number of media asset identifiers;

wherein modifying the user query further comprises:

modifying the at least one of the first Boolean operator or the second Boolean operator from AND to OR; and generating a string that combines the first information, the second information, and the third information into a query string for retrieving the modified set of media asset identifiers, wherein based on the modifying of the at least one of the first Boolean operator or the second Boolean operator from AND to OR, each media asset identifier in the modified set corresponds to a respective media asset that matches the second information and at least one of the first information and the third information; and replacing the user query with the string.

3. The method of claim 1, further comprising, further in response to determining that the first number of media asset identifiers in the set is not within the threshold range:

determining that the first number of media asset identifiers in the set is greater than the second number of media asset identifiers;

wherein modifying the user query further comprises:

modifying the at least one of the first Boolean operator or the second Boolean operator from OR to AND;

generating a string that combines the first information, the second information, and the third information into a query string for retrieving the modified set of media asset identifiers, wherein based on the modifying of the at least one of the first Boolean operator or the second Boolean operator from OR to AND, each media asset identifier in the modified set corresponds to a respective media asset that matches the second information, the first information, and the third information; and replacing the user query with the string.

4. The method of claim 1, wherein each of the first information, the second information, and the third information correspond to an information type, and wherein extracting the first information, the second information, and the third information from the user query comprises identifying a respective information type associated with each element of the user query.

5. The method of claim 1, wherein each of the first Boolean operator and the second Boolean operator is one of AND, OR, AND NOT, or NOT.

6. The method of claim 1, further comprising automatically selecting one or more filter options, corresponding to at least one of the first information, the second information, or the third information, based on an age of a user or users associated with a device at which the user query is received.

7. The method of claim 1, wherein each of the first information, the second information and the third information correspond to an information type that is associated with a data structure that stores metadata associated with the information type.

8. The method of claim 7, wherein a first information type corresponds to a genre filter option for which retrieved media asset identifiers will be displayed.

9. The method of claim 7, wherein a second information type corresponds to a provider filter option for which retrieved media asset identifiers will be displayed.

10. The method of claim 1, further comprising determining the threshold range based on capabilities of a display and a size of an indicator corresponding to a media asset identifier.

11. A system comprising:

a memory configured to store instructions for a media guidance application; and a control circuitry configured to:

receive a user query comprising first information, second information, and third information, wherein the user query comprises a first Boolean operator between the first information and the second information, and a second Boolean operator between the second information and the third information;

retrieve a set of media asset identifiers based at least in part on the user query;

calculate a first number of media asset identifiers in the set;

determine whether the first number of media asset identifiers in the set is within a threshold range of a second number of media asset identifiers; and in response to determining that the first number of media asset identifiers in the set is not within the threshold range of the second number of media asset identifiers:

extract, from the user query, the first information, the second information, and the third information;

modify the user query by modifying at least one of the first Boolean operator or the second Boolean operator; and retrieve a modified set of media asset identifiers based at least in part on the modified user query.

12. The system of claim 11, wherein the control circuitry is further configured to, further in response to the determining that the first number of media asset identifiers in the set is not within the threshold range:

determine that the first number of media asset identifiers within the set is less than the second number of media asset identifiers;

wherein the control circuitry is further configured to modify the user query by:

modifying the at least one of the first Boolean operator or the second Boolean operator from AND to OR;

generating a string that combines the first information, the second information and the third information into a query string for retrieving the modified set of media asset identifiers, wherein based on the modifying of the at least one of the first Boolean operator or the second Boolean operator from AND to OR, each media asset identifier in the modified set corresponds to a respective media asset that matches the second information and at least one of the first information, and the third information; and replacing the user query with the string.

13. The system of claim 11, wherein the control circuitry is further configured to, further in response to the determining that the first number of media asset identifiers in the set is not within the threshold range:

determine that the first number of media asset identifiers in the set is greater than the second number of media asset identifiers;

wherein the control circuitry is further configured to modify the user query by:
  modifying the at least one of the first Boolean operator or the second Boolean operator from OR to AND;
  generating a string that combines the first information, the second information and the third information into a query string for retrieving the modified set of media asset identifiers, wherein based on the modifying of the at least one of the first Boolean operator or the second Boolean operator from OR to AND, each media asset identifier in the modified set corresponds to a respective media asset that matches the second information, the first information and the third information; and
  replacing the user query with the string.

14. The system of claim 11, wherein each of the first information, the second information, and the third information correspond to an information type, and wherein the control circuitry is configured to extract the first information, the second information, and the third information from the user query by identifying a respective information type associated with each element of the user query.

15. The system of claim 11, wherein each of the first Boolean operator and the second Boolean operator is one of AND, OR, AND NOT, or NOT.

16. The system of claim 11, wherein the control circuitry is further configured to automatically select one or more filter options, corresponding to at least one of the first information, the second information, or the third information, based on an age of a user or users associated with a device at which the user query is received.

17. The system of claim 11, wherein each of the first information, the second information and the third information correspond to an information type that is associated with a data structure that stores metadata associated with the information type.

18. The system of claim 17, wherein a first information type corresponds to a genre filter option for which retrieved media asset identifiers will be displayed.

19. The system of claim 17, wherein a second information type corresponds to a provider filter option for which retrieved media asset identifiers will be displayed.

20. The system of claim 11, wherein the control circuitry is further configured to determine the threshold range based on capabilities of a display and a size of an indicator corresponding to a media asset identifier.

* * * * *